United States Patent [19]
Olszowka et al.

[11] Patent Number: 5,218,777
[45] Date of Patent: Jun. 15, 1993

[54] FISH RETAINING DEVICE

[76] Inventors: Stanley J. Olszowka, Box 6487, Bonnyville, Alberta, Canada, T9N 2H1; Angus Lawrence, R.R. #2, Red Deer, Alberta, Canada, T4N 5E2

[21] Appl. No.: 910,824

[22] Filed: Jul. 7, 1992

[30] Foreign Application Priority Data

Aug. 12, 1991 [CA] Canada .................. 2048943

[51] Int. Cl.[5] ............................................. A01K 69/00
[52] U.S. Cl. .............................................. 43/5; 43/4; 294/19.1; 294/1.1
[58] Field of Search ................... 43/5, 4, 17, 23; 294/26, 19.1, 1.1

[56] References Cited

U.S. PATENT DOCUMENTS

| | | | |
|---|---|---|---|
| 3,134,186 | 5/1964 | Krueger | 43/4 |
| 3,722,940 | 3/1973 | Misjak | 43/4 |
| 4,866,872 | 9/1989 | Guilbault et al. | 43/4 |
| 5,048,220 | 9/1991 | Harris | 43/4 |

Primary Examiner—Richard K. Seidel
Assistant Examiner—Chuck Y. Mah
Attorney, Agent, or Firm—Davis, Bujold & Streck

[57] ABSTRACT

A fish retaining device consisting of an elongate support having a first end and a second end. A transverse brace member is secured to the first end of the elongate support for suspending the elongate support in an opening made through ice for ice fishing such that the second end of the elongate support extends toward a bottom of the ice opening. A frame is secured to the second end of the elongate support. The frame has a central passage and extends substantially perpendicular to the elongate support. The frame substantially fills the ice opening such that there is no room for a fish to pass between the frame and the ice opening. A one-way gate is pivotally mounted to the frame. The gate pivots toward the first end of the elongate support such that clearance is provided for the passage of a fish through the central passage of the frame into the ice opening. The gate rests upon the frame which serves as a stop preventing the gate from pivoting toward the second end of the elongate support thereby closing the central passage and retaining the fish within the ice opening.

1 Claim, 2 Drawing Sheets

FISH RETAINING DEVICE

The present invention relates to a fish retaining device for use in ice fishing.

BACKGROUND OF THE INVENTION

When ice fishing an opening is cut through many feet of ice. A line is then inserted through the opening in order to catch fish feeding in the depths below. Frequently, as the fisherman hauls a fish he has hooked up through the ice opening, a portion of the fish in which the hook is embedded (such as the lip, gill, or jaw) will break and the fish will escape. Other times, with the change in pressure as the fish comes to the surface, an expansion of the air sacs of the fish dislodges the hook.

In most cases where the fish escapes it is injured to the point where it can no longer survive.

SUMMARY OF THE INVENTION

What is required is a device which will retain a fish which escapes while being drawn up through an ice opening.

According to the present invention there is provided a fish retaining device for use in ice fishing. The fish retaining device is comprised of an elongate support having a first end and a second end. Means are secured to the first end of the elongate support for suspending the elongate support in an opening made through ice for ice fishing such that the second end of the elongate support extends toward a bottom of the ice opening. A frame is secured to the second end of the elongate support. The frame has a central passage and extends substantially perpendicular to the elongate support. The frame substantially fills the ice opening such that there is no room for a fish to pass between the frame and the ice opening. A one-way gate is pivotally mounted to the frame. The gate pivots toward the first end of the elongate support such that clearance is provided for the passage of a fish through the central passage of the frame into the ice opening. Stop means is provided preventing the gate from pivoting toward the second end of the elongate support thereby closing the central passage and retaining the fish within the ice opening.

The present invention solves the problem of injured fish escaping from the ice opening, by creating a one way gate within the ice opening. A fish on a line is drawn up into the ice opening through the one way gate which pivots to allow the entry of the fish. Once the fish is within the ice opening the gate falls closed by force of gravity and the fish is retained within the ice opening.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
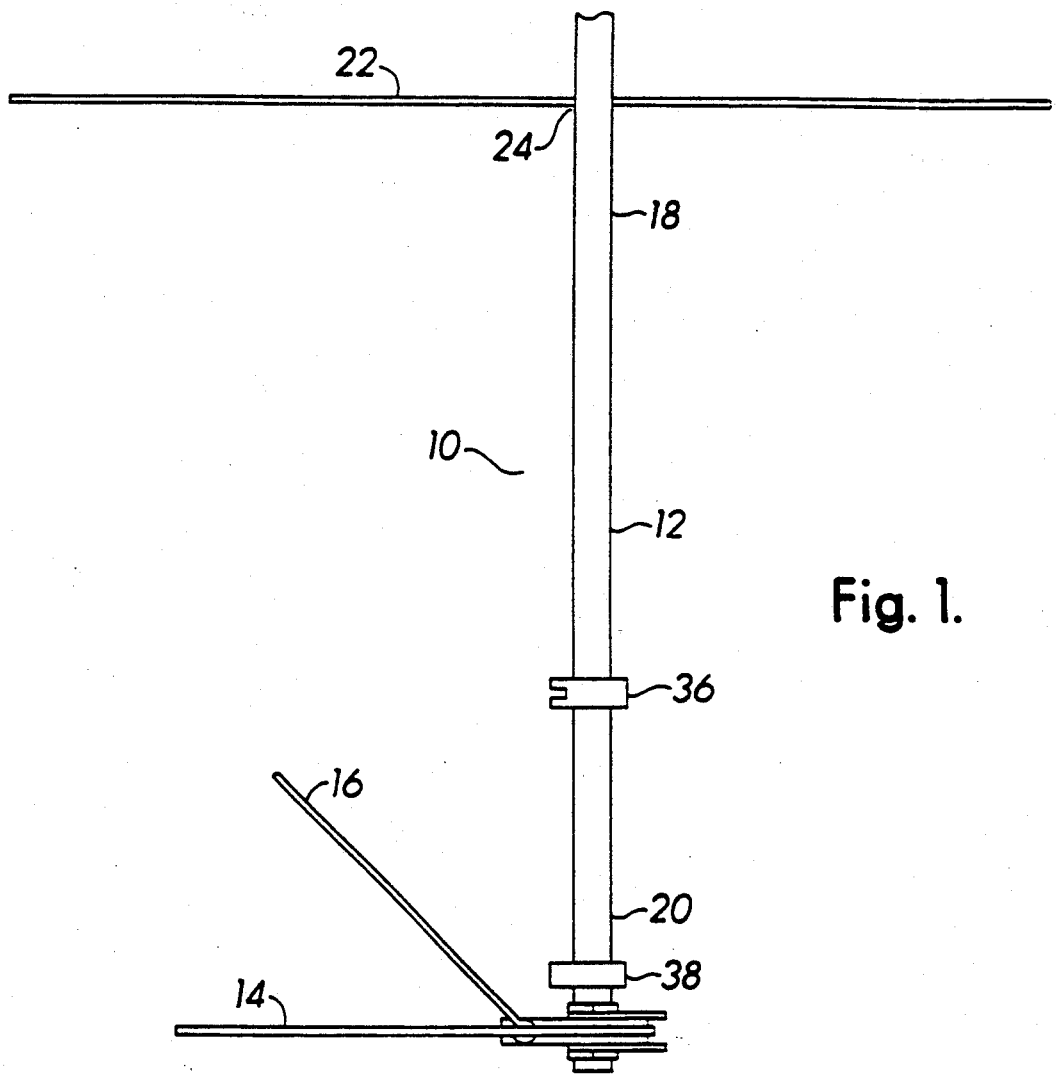
FIG. 1 is a side elevation view of a preferred embodiment of the invention.
Figure 2:
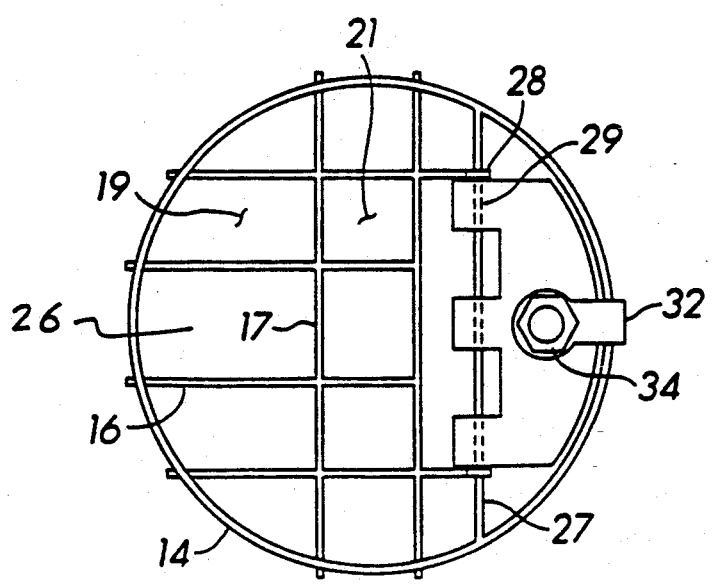
FIG. 2 is a bottom view of the fish retaining device illustrated in FIG. 1.
Figure 3:
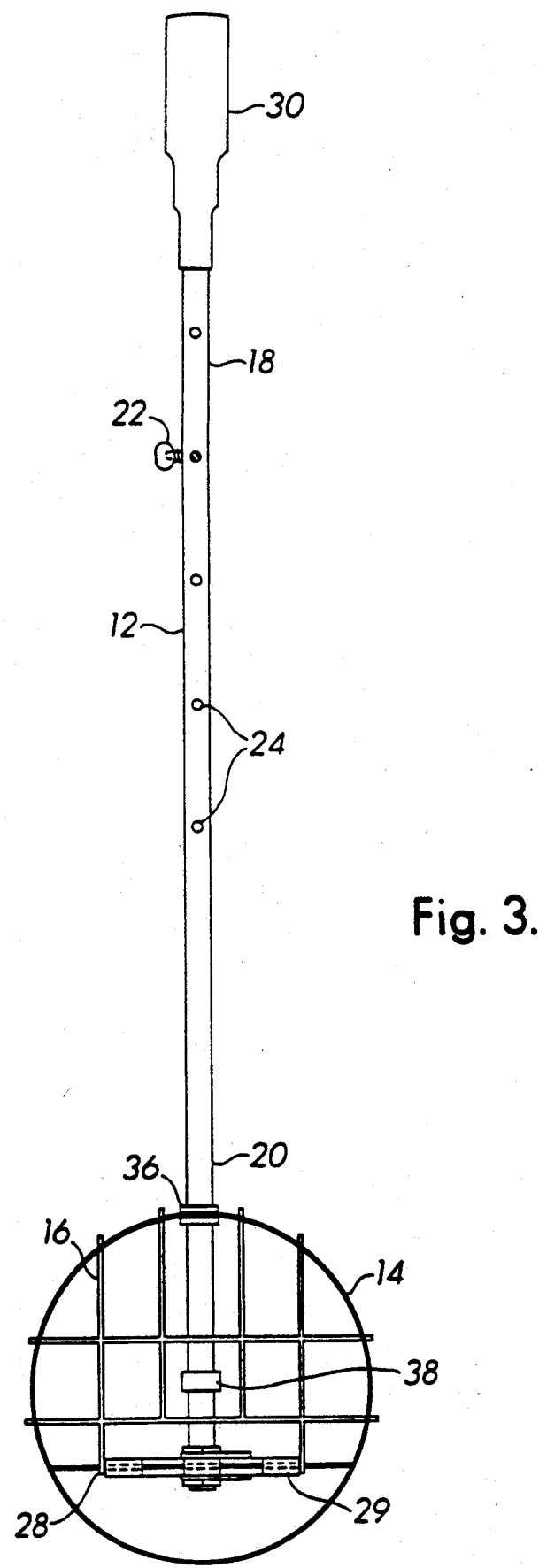
FIG. 3 is an alternate side elevation view of the fish retaining device illustrated in FIG. 1.

The preferred embodiment, a fish retaining device for use in ice fishing generally identified by reference numeral 10, will now be described with reference to FIGS. 1 through 3.

Fish retaining device 10 consists three main components; an elongate support 12, a frame 14, and a one way gate 16. Elongate support 12 has a first end 18 and a second end 20. In order to function properly some means must be provided at first end 18 for suspending elongate support 12 in an opening made through ice for ice fishing (not shown) such that second end 20 is positioned towards a bottom of the ice opening. In the illustrated embodiment, the means employed is a transverse brace 22 which is inserted through one of holes 24 in elongate support 12. Frame 14 is secured to second end 20 of elongate support 12. Frame 14 has a central passage 26 and in the operative position, illustrated in FIGS. 1 and 2, extends substantially perpendicular to elongate support 12. It is intended that frame 14 will substantially fill the ice opening such that there is no room for a fish to pass between frame 14 and the ice opening. A fixed cross-member 27 extends across frame 14. A first hinge 28 pivotally connects gate 16 to fixed cross-member 27 of frame 14. Gate 16 is constructed in the form of a grate with a series of cross-members 17 and having some closed spaces 19 and some closed spaces 21 between the cross-members 17. The use and operation of one way gate 16 will be hereinafter further described.

The illustrated embodiment has some optional features intended merely for ease of handling and storage. A handle 30 is provided at first end 18. A second hinge 29 is secured to second end 20 of elongate support 12 and pivotally connects elongate support 12 to fixed cross-member 27 of frame 14. Elongate support 12 has a tab 32 positioned at second end 20 which is secured in position by a nut 34. Tab 32 serves as a means for locking second hinge 29 to frame 14. When tab 32 overlaps frame 14, frame 14 is locked in a positioned substantially perpendicular to elongate support 12. When tab 32 is moved off of frame 14, frame 14 pivots to a stored position substantially parallel to elongate support 12 as illustrated in FIG. 3, and is retained in the stored position by clip 36. A gate stop 38 is provided which is slidable along elongate support 12. The purpose of gate stop 38 is to ensure that gate 16 always returns to a closed position, as will hereinafter be further described.

The use and operation of fish retaining device 10 will now be described with reference to FIGS. 1 through 3. Fish retaining device 10 is typically carried in a stored position as illustrated in FIG. 3. Once an opening is created through the ice, fish retaining device 10 must be prepared for insertion into the ice opening. Frame 14 is detached from the grasp of clip 36 and pivoted into a position substantially perpendicular to elongate support 12. Frame 14 is locked in this perpendicular position by movement of tab 32. Transverse brace 22 is inserted through one of holes 24 in elongate support 12 in order to suspend elongate support 12 with second end 20 positioned towards a bottom of the ice opening. Frame 14 should substantially fill the ice opening so that there is no room for a fish to pass between frame 14 and the ice opening. Presumably this is taken into consideration at the time the ice opening is made. With fish retaining device 10 in position frame 14 lies transverse to the ice opening and one way gate 16 rests by force of gravity upon frame 14 closing central passage 26. It can be seen that with this embodiment frame 14 serves as a stop means to prevent gate 16 from pivoting toward second end 20 of elongate support 12. Fish retaining device 10 remains in this position as fishing commences. The fisherman passes his line through one of open spaces 19 between cross-members 17 of gate 16. It should be noted that the fisherman should not pass his line through one of closed spaces 21, as this will prevent the fisherman from drawing the fish past gate 16. Once a fish is hooked and pulled up against gate 16, the force exerted causes gate 16 to pivot toward first end 18 of elongate support 12. Gate 16 opens enough to provide clearance for the passage of a fish through central passage 26 of frame 12 and into the ice opening. The presence of stop 38 prevents gate 16 from remaining in an open position. Once the fish has passed through central passage 26 gate 16 falls by force of gravity back onto frame 14. When gate 16 rests upon frame 14 central passage 26 is closed, retaining the fish within the ice opening.

It will be apparent to one skilled in the art that fish retaining device as described will prevent injured fish from escaping from the ice opening. It will also be apparent to one skilled in the art that modifications may be made to the illustrated embodiment without departing from the spirit and scope of the invention as defined by the claims. For example, one modification contemplated is the use of an elongate support 12 which is telescopically extendable, to provide more flexibility on the depth of placement of frame 14.

The embodiments of the invention in which an exclusive property or privilege is claimed are defined as follows:

1. A fish retaining device for use in ice fishing, comprising:

a) an elongate support having a first end and a second end;
b) means secured to the first end of the elongate support for suspending the elongate support in an opening made through ice for ice fishing such that the second end of the elongate support extends toward a bottom of the ice opening;
c) a frame secured to the second end of the elongate support, the frame having a central passage and, when suspended in an ice opening, substantially filling the ice opening such that there is no room for a fish to pass between the frame and the ice opening;
d) a fixed cross-member extending across the frame, a gate being pivotally mounted to the fixed cross-member of the frame by a first hinge, and a second hinge pivotally mounting the fixed cross-member of the frame to the elongate support, means being provided to lock the second hinge to the frame such that in a locked position the frame extends substantially horizontally from the elongate support and the gate is pivotable toward the first end of the elongate support such that clearance is provided for the passage of a fish through the central passage of the frame suspended in the ice opening, and in an unlocked position the frame being pivotable to a stored position substantially parallel to the elongate support; and
e) stop means for preventing the gate from pivoting toward the second end of the elongate support thereby closing the central passage and preventing a fish from passing through the central passage toward the bottom of the ice opening.

* * * * *